United States Patent [19]

McDonnell

[11] 3,909,038
[45] Sept. 30, 1975

[54] VEHICLE SAFETY SYSTEM
[76] Inventor: Leo G. McDonnell, 19917 Kinloch, Detroit, Mich. 48240
[22] Filed: Aug. 13, 1974
[21] Appl. No.: 496,962

Related U.S. Application Data
[63] Continuation-in-part of Ser. No. 320,991, Jan. 4, 1973, Pat. No. 3,832,000.

[52] U.S. Cl. ............................ 280/150 B; 296/84 K
[51] Int. Cl.² .................................... B60R 21/08
[58] Field of Search .............. 296/84 K; 280/150 B; 244/121

[56] References Cited
UNITED STATES PATENTS

| | | | |
|---|---|---|---|
| 2,025,822 | 12/1935 | Pryor | 280/150 B |
| 2,586,063 | 2/1952 | Kurtz | 280/150 B |
| 3,687,485 | 8/1972 | Campbell | 296/84 K |
| 3,692,327 | 9/1972 | Barrick | 296/84 K |
| 3,695,629 | 10/1972 | Schlanger | 296/84 K |

Primary Examiner—Kenneth H. Betts
Assistant Examiner—John A. Pekar
Attorney, Agent, or Firm—William L. Fisher, Esq.

[57] ABSTRACT

Improvement in a vehicle safety system employing vehicle safety arrangement including a safety curtain having a latched safety curtain and a curtain gate therefor which gate is thrown from an elevated to a lowered position in a vehicle to achieve vehicle safety for an occupant of a seat in the vehicle, said improvement comprising providing a cross-piece for said gate which is off-set from its ends, the bottom of the curtain attached to the cross-piece, an arrangement for pulling the ends of the gate in a straight downward path, and an arrangement for rotating the gate during its downward travel so that the cross-piece thereof and the bottom of the curtain swing over and clear of the head of the occupant.

15 Claims, 8 Drawing Figures

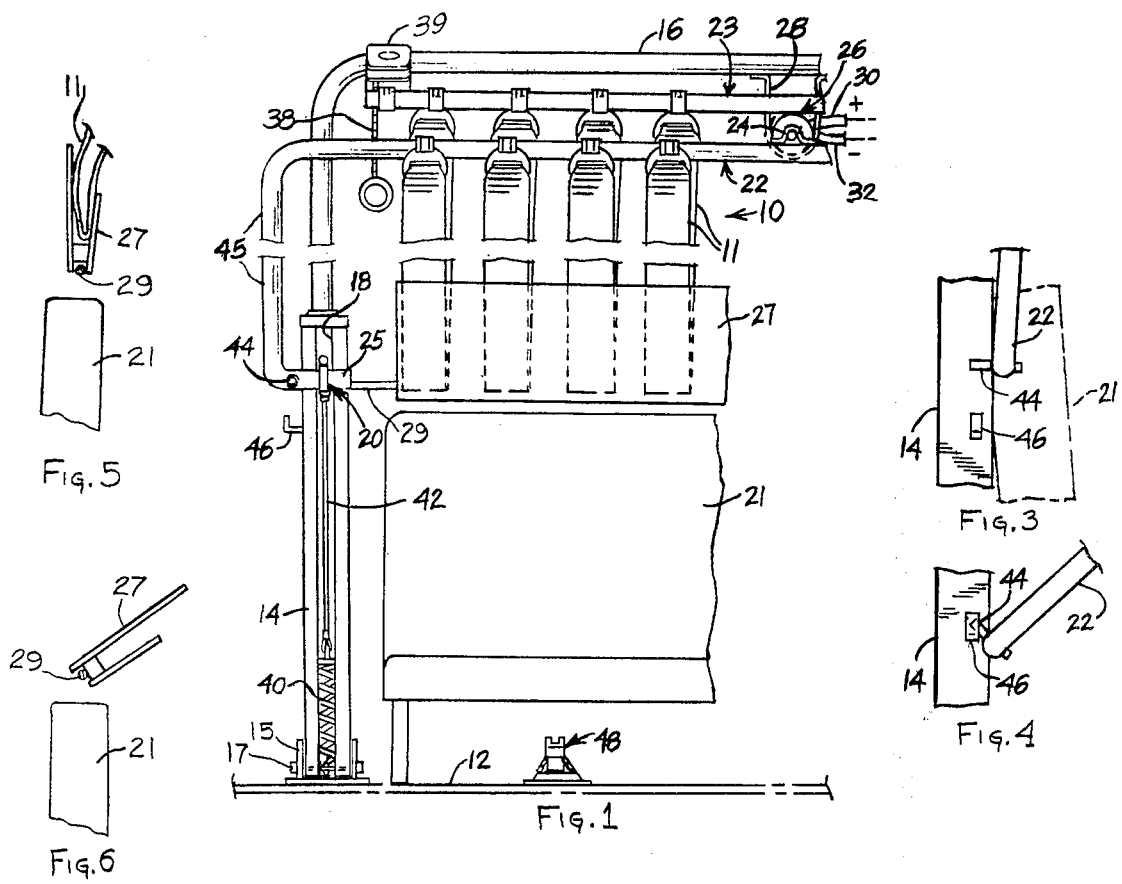
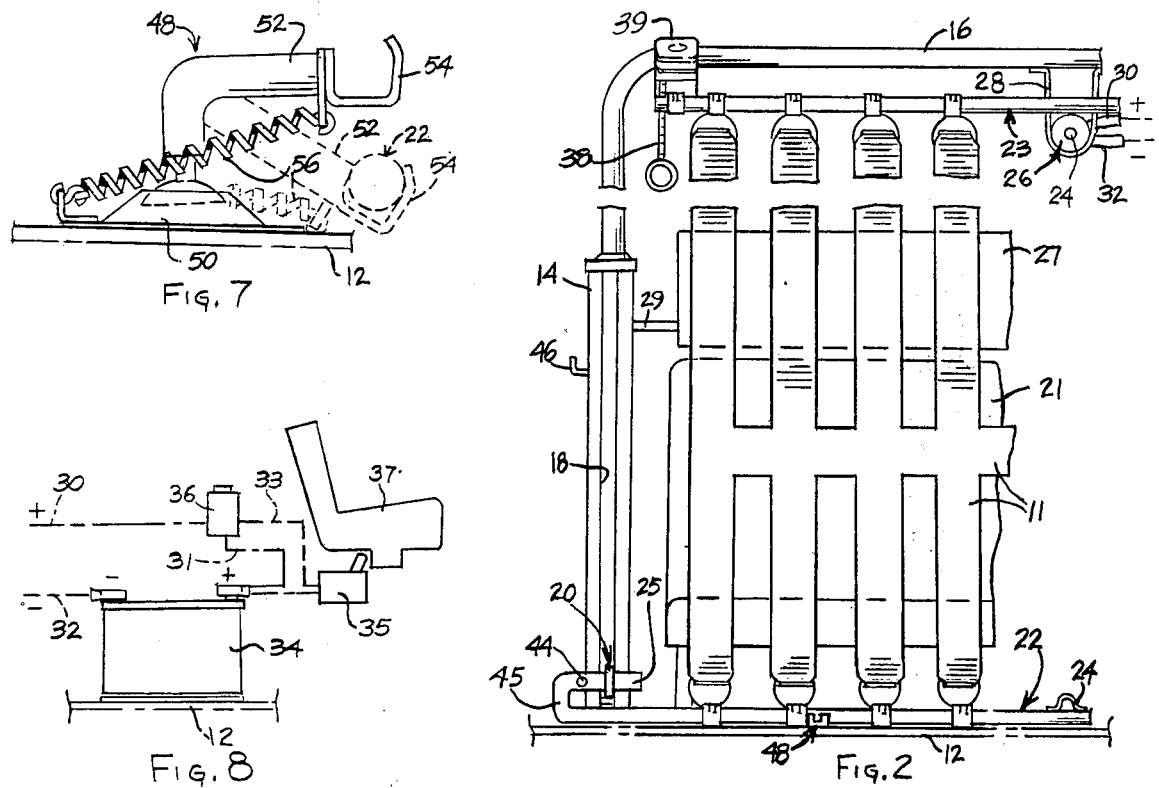

VEHICLE SAFETY SYSTEM

CROSS REFERENCE TO RELATED APPLICATION

This application is a continuation-in-part of my prior copending application Ser. No. 320,991 filed Jan. 4, 1973, now U.S. Pat. No. 3,832,000.

My invention relates to vehicles and to means and method for achieving vehicle safety of occupants thereof. My afore-mentioned prior patent application discloses a vehicle safety system employing full body safety curtain means to achieve vehicle safety for occupants of a vehicle but I have since invented improvements in respect to said safety system, the provision of which is the principal object of my invention.

The foregoing object of my invention and the advantages thereof will become apparent during the course of the following description, taken in conjunction with the accompanying drawings, in which:

FIGS. 1 and 2 are respective front elevational views of a vehicle safety system embodying my invention showing different positions of the safety curtain means employed therein;

FIGS. 3 and 4 are respective fragmentary side elevational views of a portion of the structure of FIG. 1 showing different positions thereof;

FIGS. 5 and 6 are respective fragmentary sectional views of a portion of the structure of FIG. 1 showing different positions thereof;

FIG. 7 is a side elevational view of a portion of the structure of FIG. 1; and

FIG. 8 is a diagramatic view of further means employed in my improved vehicle safety system.

Referring to the drawings in greater detail, 10 generally designates safety curtain means employed in my vehicle safety system which includes a safety curtain 11 supported on a pair of stanchions 14 in turn supported by suitable vehicle framing (not shown) on the vehicle floor 12 via box-like clamps 15. Said safety curtain 11 which is a full bodied safety curtain consists of conventional vehicle safety belts criss-crossed and sewn together. Said stanchions 14 are disposed on opposite sides of a vehicle seat 21 alongside the backrest thereof and are connected together at the tops thereof by a U-shaped cross brace 16. Each stanchion 14 is hollow and slidably carries a connector 20 which extends through a slot 18 therein. Said connectors 20 are constructed to ride on rollers within the respective stanchions 14 like the connectors 186 in said prior application and join a curtain gate 22 at the ends 25 of the latter. Said gate 22 is constructed like a crank or saddle so as to have a main body portion or cross-piece thereof which extends between said stanchions 14 and to which the lower end of said safety curtain 11 is fastened and throw portions 45 for clearing the head or heads of an occupant or occupants of said seat 21. Said gate 22 is normally held in an elevated position by latch means which includes a solenoid 26 supported on the brace 16 via a bracket 28 and a detent 24 made fast to the gate 22 in which the plunger of said solenoid 26 extends in the de-energized condition of the latter. Another curtain gate 23 to which the upper end of said safety curtain 11 is fastened is normally held in an elevated position by lock means which includes a pair of conventional vehicle safety belt locks 39 fastened to said brace 16 and having pull chains 38 for unlocking them. The middle portion of the safety curtain 11 is supported and stored in a box 27 pivotally mounted on a cross rod 29 above the vehicle seat 21 between said stanchions 14.

The gate 22, when unlatched, is thrown to the floor 12 of the vehicle by gravity and by a pair of power units located in the stanchions 14, respectively, and consisting of tension springs 40 (fastened in the bottoms of the stanchions 14 via bolts 17) and non-kinking chains 42 joining the upper ends of said springs 40 with the connectors 20. During its throw, and without significant slowdown of its downward travel, the gate 22 is rotated or swung on an axis coinciding with the ends 25 thereof by rearwardly projecting bolts 44 fastened to said ends 25 striking stops 46 fastened to the stanchions 14. The ends 25 of the gate 22 travel in a straight vertical path down the length of the stanchions 14 while the main body portion thereof is thrown by the throw portions 45 thereof over and forwardly of the head or heads of the occupant or occupants of the seat 21 toward the floor 12 of the vehicle. Prior to the main body portion of the gate 22 striking the floor 12 it strikes a pivotal arm 52 of a floor-mounted locking device 48. Said device 48 includes a pair of tension springs 56 fastened to said arm 52 and the base 50 of said device 48 for holding the arm 52 in its two extreme positions. Said base 50 provides a universal swivel connection for said arm 52, as shown. Said main body portion of the gate 22 slides downwardly on the arm 52 and becomes captured in a socket 54 on the free end of the arm 52. Said socket 54 angularly rotates with downward movement of the arm 52 to lock said main body portion therein. In its thrown position the gate 22 is higher at its rear end than at its front end because its ends 25 are held up by the relaxed tension springs 40.

Triggering of the safety curtain 10 is effected by electrical circuitry for said solenoid 26 consisting of electrical lines 30-33, electrical power source 34 and electrical switch means 35 and 36, closing of either of which energizes said solenoid 26. Said switch means 35 is a limit switch arranged to be closed upon rearward movement of a driver's seat 37 which is power actuated rearwardly upon collision of said vehicle as described in said prior application. Said driver's seat 37 may be actuated rearwardly upon triggering of a front bumper mechanical switch or collision-sensing mechanism as shown and described in said prior application. Said mechanical bumper switch or collision-sensing mechanism may be mounted at the rear bumper of the vehicle so as to sense a rear collision thereof. A safety curtain means similar to said safety curtain means 10 may be provided for said driver's seat 37 and latched and triggered upon rearward movement thereof as described in said prior application or by said detent 24 and solenoid 26 and the herein shown electrical circuitry for the latter. Upon energization of the solenoid 26 the plunger thereof retracts and releases the gate 22 which is thrown to the floor 12, as described, and during such movement of said gate 22 it swings, as described, so that its main body portion or cross-piece moves forwardly and downwardly to clear the head or heads of the occupant or occupants of said seat 21. As the gate 22 is thrown the safety curtain 11 is pulled thereby from the latter's stored position in the pivotable box 27. Said box 27 pivots downwardly and forwardly on the rod 29 to dump out therefrom the portion of the safety curtain 11 stored therein. After the gate 22 is thrown, it is locked in said device 48 and said occupant or occupants can step out from behind the thrown safety curtain 11 by pulling down the chains 38 and manually lowering the gate 23 to the floor 12 of the vehicle. When the gate 23 is so lowered the entire safety curtain 11 with the belts is lowered with said gate 23. Said switch means 36 is a manual switch means, particularly useful on a passenger vehicle equipped with said safety means 10 at every passenger seat thereof, which switch means 36 may be manually closed to simultaneously energize all of the solenoids 26 (there being a solenoid 26 for each passenger seat) on said vehicle by the driver of a bus, for example, who may forsee a forthcoming collision for said bus or by an authorized crew member of an aircraft, for example, in preparation for each take-off and landing thereof. Preferably, the slots 18 are covered to prevent the insertion of fingers therein by flexible plastic coverings (not shown) held on the stanchions 14 in front of said slots 18. The lower ends of said coverings are made fast to the bottoms of the stanchions while the upper ends thereof are affixed to the ends 25 of said gate 23 so as to move downwardly therewith. In the lowered thrown position of said gate 23 said coverings pile up at the bottom of the stanchions 14 in front thereof much like the non-kinking chains 43 pile up at the bottom of said stanchions 14 inside thereof.

It will thus be seen that there has been provided by my invention improvements in a vehicle safety system in which the object hereinabove set forth, together with many thoroughly practical advantages, has been successfully achieved. While a preferred embodiment of my invention has been shown and described, it is to be understood that variations and changes may be resorted to without departing from the spirit of my invention as defined by the appended claims.

What I claim is:

1. Improvement in a vehicle safety system employing vehicle safety means including safety curtain means having a latched safety curtain and a curtain gate therefor which gate is thrown from an elevated to a lowered position in a vehicle to achieve vehicle safety for an occupant of a seat in said vehicle, said safety curtain being a full body curtain, said improvement comprising a construction for said gate providing a cross-piece therefor which is offset from its ends, means for attaching the bottom of said curtain to said cross-piece, means for pulling the ends of said gate and guiding the same in a straight downward path, and means for rotating the gate during its downward travel so that the cross-piece thereof and the bottom of said curtain swing over and clear of the head of the occupant.

2. Improvement as claimed in claim 1, projecting means on the ends of said gate, means providing stationary stops for said projecting means so that during the downward travel of said gate said projecting means strikes said stops to rotate said gate without impeding the downward travel thereof.

3. Improvement as claimed in claim 1, electrical means including solenoid means for latching said gate and means for energizing said solenoid means to unlatch said gate.

4. Improvement as claimed in claim 3, said electrical means including manual switch means closed upon manual actuation thereof for energizing said solenoid means.

5. Improvement as claimed in claim 1, means for locking said gate in its lowered thrown position comprising a locking device having a pivotally moveable arm having a socket in the free end thereof and yieldable means normally holding said arm in an elevated position so it can be struck by said gate.

6. Improvement as claimed in claim 1, a pair of hollow stanchions on opposite sides of said vehicle seat, a power pulling mechanism for said gate within each stanchion operative, respectively, upon the ends of said gate for pulling the ends of said gate in a straight downward path.

7. Improvement as claimed in claim 1, a storage box for storing the middle section of said safety curtain, and means for pivotally mounting said box above said seat so that during the throw of said gate said box dumps said middle section therefrom over and forwardly of the head of said occupant.

8. Improvement as claimed in claim 1, a second curtain gate for said safety curtain, means for locking said second gate against movement during throw of the first-mentioned gate, said second gate locked in an elevated position in said vehicle, and manual means for unlocking said second gate so that subsequent to a collision of the vehicle said occupant can step out from behind the thrown safety curtain by manually lowering said second gate to the floor of said vehicle.

9. Improvement in a vehicle safety system employing vehicle safety method including safety curtain means having a latched safety curtain and a curtain gate therefor which gate is thrown from an elevated to a lowered position in a vehicle to achieve vehicle safety for an occupant of a seat in said vehicle, said safety curtain being a full body curtain, said gate having a cross-piece which is offset from its ends, said improvement comprising attaching the bottom of said curtain to said cross-piece, pulling and guiding the ends of said gate in a straight downward path, rotating said gate during its downward travel so that said cross-piece and the bottom of said curtain swing over and clear of the head of said occupant.

10. Improvement as claimed in claim 9, causing the ends of said gate to strike stop means during its downward travel to so rotate said gate without impeding the downward travel thereof.

11. Improvement as claimed in claim 9, electrically and mechanically latching said gate and energizing a circuit upon collision of said vehicle to unlatch said gate.

12. Improvement as claimed in claim 9, electrically and mechanically latching said gate and manually energizing a circuit in anticipation of a collision of said vehicle to unlatch said gate.

13. Improvement as claimed in claim 9, providing a yieldable pulling force enclosing said yieldable pulling force in a guarded enclosure for safety purposes, and pulling upon the ends of said gate with said yieldable pulling force.

14. Improvement as claimed in claim 9, storing the middle section of said safety curtain above the rear of said seat and, during the throw of said gate, dumping said middle section over and forwardly of the head of said occupant.

15. Improvement as claimed in claim 9, locking the top of the curtain in an elevated position in said vehicle against movement, said locking step being accomplished before and maintained during throw of said gate, manually unlocking the top of the curtain subsequent to collision of the vehicle and lowering it to the floor of the vehicle so that said occupant can step out from behind the thrown safety curtain.

* * * * *